(12) United States Patent
Jang et al.

(10) Patent No.: US 11,899,171 B2
(45) Date of Patent: Feb. 13, 2024

(54) IMAGING LENS SYSTEM

(71) Applicant: Samsung Electro-Mechanics Co., Ltd., Suwon-si (KR)

(72) Inventors: Sang Hyun Jang, Suwon-si (KR); Ki Jin Nam, Suwon-si (KR); Yong Joo Jo, Suwon-si (KR); Phil Ho Jung, Suwon-si (KR); Ju Hwa Son, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 437 days.

(21) Appl. No.: 16/998,063

(22) Filed: Aug. 20, 2020

(65) Prior Publication Data

US 2021/0325640 A1    Oct. 21, 2021

(30) Foreign Application Priority Data

Apr. 17, 2020    (KR) .................. 10-2020-0046525

(51) Int. Cl.
  *G02B 13/00*    (2006.01)
  *G02B 9/64*    (2006.01)

(52) U.S. Cl.
  CPC .......... *G02B 13/0045* (2013.01); *G02B 9/64* (2013.01)

(58) Field of Classification Search
  CPC ............ G02B 13/0045; G02B 13/0015; G02B 13/002; G02B 13/001; G02B 9/64; G02B 3/02; G02B 27/00; G02B 27/0955; G02B 7/021; G02B 1/041
  See application file for complete search history.

(56) References Cited

U.S. PATENT DOCUMENTS

| 2014/0043694 A1 | 2/2014 | Tsai et al. |
| 2014/0063621 A1 | 3/2014 | Hsueh et al. |
| 2015/0103414 A1 | 4/2015 | Baik |
| 2017/0003482 A1* | 1/2017 | Chen ........................ G02B 9/64 |
| 2017/0336605 A1 | 11/2017 | Lai et al. |
| 2017/0336606 A1 | 11/2017 | Lai et al. |
| 2019/0025551 A1 | 1/2019 | Kuo |

(Continued)

FOREIGN PATENT DOCUMENTS

| CN | 107402436 A | 11/2017 |
| CN | 109613679 A | 4/2019 |

(Continued)

OTHER PUBLICATIONS

Lohmann, A.W., Scaling laws for lens systems, Dec. 1, 1989, Applied Optics, vol. 28, No. 23, pp. 4996-4998 (Year: 1989).*

(Continued)

*Primary Examiner* — Marin Pichler
*Assistant Examiner* — Justin W. Hustoft
(74) *Attorney, Agent, or Firm* — NSIP Law

(57) ABSTRACT

An imaging lens system includes a first lens, a second lens, a third lens, a fourth lens, a fifth lens, a sixth lens, and a seventh lens disposed in order from an object side. In the imaging lens system, the first lens has positive refractive power and an object-side surface of the first lens is concave. A field of view of the imaging lens system is 100 degrees or more. In the imaging lens system, a distance TTL from the object-side surface of the first lens to an imaging plane and a height ImgH of the imaging plane satisfy TTL/ImgH<1.5.

15 Claims, 10 Drawing Sheets

(56) References Cited

U.S. PATENT DOCUMENTS

| | | | |
|---|---|---|---|
| 2019/0094494 A1 | 3/2019 | Hsu et al. | |
| 2019/0129150 A1 | 5/2019 | Tsai et al. | |
| 2019/0146184 A1 | 5/2019 | Xu et al. | |
| 2019/0154974 A1 | 5/2019 | Chen | |
| 2019/0179117 A1 | 6/2019 | Kim et al. | |
| 2019/0243106 A1 | 8/2019 | Xu et al. | |
| 2019/0369362 A1 | 12/2019 | Son et al. | |
| 2020/0209546 A1 | 7/2020 | Zhao et al. | |
| 2021/0055515 A1 | 2/2021 | Dai et al. | |
| 2021/0088755 A1* | 3/2021 | Nitta | G02B 9/64 |
| 2021/0149160 A1 | 5/2021 | Dong et al. | |
| 2021/0389558 A1 | 12/2021 | Son et al. | |

FOREIGN PATENT DOCUMENTS

| | | | | |
|---|---|---|---|---|
| CN | 110456481 A | | 11/2019 | |
| CN | 110542981 A | | 12/2019 | |
| CN | 110908073 A | | 3/2020 | |
| CN | 111077647 A | * | 4/2020 | ......... G02B 13/0015 |
| CN | 111077647 A | | 4/2020 | |
| CN | 111208629 A | | 5/2020 | |
| KR | 10-2019-0135897 A | | 12/2019 | |
| TW | I449947 B | | 8/2014 | |

OTHER PUBLICATIONS

Taiwanese Office Action dated Feb. 19, 2021 issued in the corresponding Taiwanese Patent Application No. 109129017. (5 pages in English)(4 pages in Taiwanese).

Korean Office Action dated Jul. 30, 2021 in counterpart Korean Patent Application No. 10-2020-0046525 (6 pages in English and 5 pages in Korean).

Taiwanese Office Action dated Jan. 3, 2022, in counterpart Taiwanese Patent Application No. 110127695 (4 pages in English and 5 pages in Mandarin).

Chinese Office Action dated Jun. 14, 2022 in counterpart Chinese Patent Application No. 202011215519.3 (10 pages in English, 11 page in Chinese).

Chinese Office Action dated Dec. 6, 2022, in counterpart Chinese Patent Application No. 202011215519.3 (7 pages in English, 8 pages in Chinese).

Korean Office Action dated Jan. 6, 2023, in counterpart Korean Patent Application No. 10-2022-0054777 (6 pages in English, 4 pages in Korean).

United States Office Action dated Jul. 6, 2023, in copending U.S. Appl. No. 17/858,195 (8 pages in English).

Korean Office Action dated Jul. 26, 2023, in counterpart Korean Patent Application No. 10-2022-0054777 (5 pages in English, 4 pages in Korean).

U.S. Office Action dated Oct. 25, 2023, in related U.S. Appl. No. 17/858,195 (9 pages).

* cited by examiner

IMAGING LENS SYSTEM

CROSS-REFERENCE TO RELATED APPLICATION(S)

This application claims the benefit under 35 USC 119(a) of Korean Patent Application No. 10-2020-0046525 filed on Apr. 17, 2020 in the Korean Intellectual Property Office, the entire disclosure of which is incorporated herein by reference for all purposes.

BACKGROUND

1. Field

This application relates to an imaging lens system including seven lenses.

2. Description of Related Art

A small-sized camera may be mounted in a wireless terminal device. For example, small-sized cameras may be mounted on a front surface and a rear surface of a wireless terminal device, respectively. Since small-sized cameras are used for various purposes such as outdoor scenery pictures, indoor portrait pictures, and the like, they are required to have levels of performance comparable to that of ordinary cameras. However, it may be difficult for a small-sized camera to implement high performance because a mounting space of the small-sized camera is restricted by a size of a wireless terminal device. In particular, since severe distortion occurs in a camera having a field of view of 100 degrees or more, there is a need for development of a camera or an imaging lens system having low distortion while having a field of view of 100 degrees or more.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An imaging lens system capable of significantly reducing distortion while having a wide field of view.

In one general aspect, an imaging lens system includes a first lens, a second lens, a third lens, a fourth lens, a fifth lens, a sixth lens, and a seventh lens disposed in order from an object side. In the imaging lens system, the first lens has positive refractive power and an object-side surface of the first lens is concave. A field of view of the imaging lens system is 100 degrees or more. In the imaging lens system, a distance TTL from the object-side surface of the first lens to an imaging plane and a height ImgH of the imaging plane satisfy TTL/ImgH<1.5.

The second lens may have negative refractive power.
The third lens may have positive refractive power.
An object-side surface of the fourth lens may be convex.
An object-side surface of the fifth lens may be concave.
The sixth lens may have positive refractive power.
The seventh lens may have negative refractive power.
The imaging lens system may satisfy $-2.0<(ImgH/(f*\tan(FOV/2))-1)*100<2.0$, where f is a focal length of the imaging lens system and FOV is a field of view of the imaging lens system.

The imaging lens system may satisfy D12/D23<0.14, where D12 is a distance from an image-side surface of the first lens to an object-side surface of the second lens and D23 is a distance from an image-side surface of the second lens to an object-side surface of the third lens.

The imaging lens system may satisfy 1.2<D23/D34, where D23 is a distance from an image-side surface of the second lens to an object-side surface of the third lens and D34 is a distance from an image-side surface of the third lens to an object-side surface of the fourth lens.

The imaging lens system may satisfy $-0.2<f3/f2<-0.04$, where f2 is a focal length of the second lens and f3 is a focal length of the third lens.

In another general aspect, am imaging lens system includes a plurality of lenses disposed on an object-side of an imaging plane. In the imaging lens system, $-2.0<(ImgH/(f*\tan(FOV/2))-1)*100<2.0$ and TTL/ImgH<1.5, where ImgH is a height of the imaging plane, f is a focal length of the imaging lens system, FOV is a field of view of the imaging lens system, and TTL is a distance from an object-side surface of a lens, from among the plurality of lenses, disposed closest to the object side, to the imaging plane.

The field of view of the imaging lens system may be 100 degree or more.

Among the plurality of lenses, the lens closest to the object side may have positive refractive power and an object-side surface of the lens closest to the object side may be concave.

The imaging lens system may satisfy 1.6<TTL/f<1.8.
The imaging lens system may satisfy 0.2<Tmax/ImgH<0.3, where Tmax is a thickness of a center of a lens having the highest thickness in a center of an optical axis, among the plurality of lenses.

The plurality of lenses may include a first lens having positive refractive power, a second lens having negative refractive power, a third lens having positive refractive power, a fourth lens having negative refractive power, a fifth lens having negative refractive power, a sixth lens having positive refractive power, and a seventh lens having negative refractive power disposed in order from the object side.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
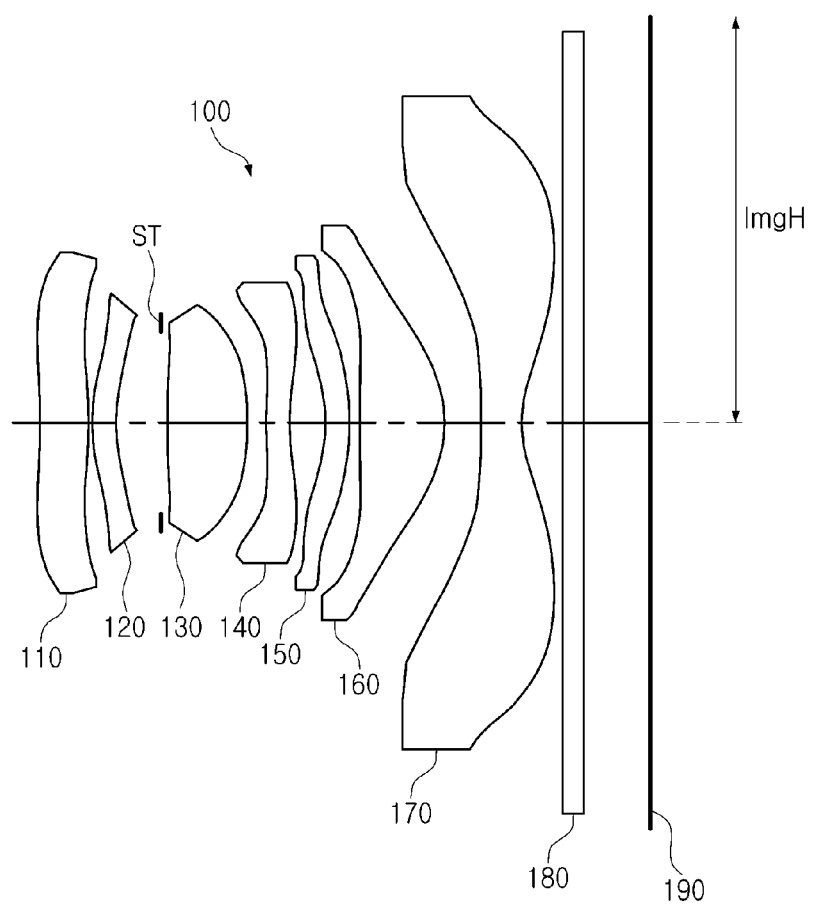
FIG. 1 illustrates a configuration of an imaging lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the examples, a first lens refers to a lens most adjacent to an object (or a subject), and a seventh lens refers to a lens most adjacent to an imaging plane (or an image sensor). In the examples, units of a radius of curvature, a thickness, a TTL (a distance from an object-side surface of the first lens to an imaging surface), a 2Img_HT (a diagonal length of an imaging plane), and a focal length are indicated in millimeters (mm).

A thickness of a lens, a gap between lenses, and a TTL refer to a distance of a lens along an optical axis. Also, in the descriptions of a shape of a lens, the configuration in which one surface is convex indicates that a paraxial region of the corresponding surface is convex, and the configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

An imaging lens system includes five or more lenses. For example, the imaging lens system may include a first lens, a second lens, a third lens, a fourth lens, and a fifth lens disposed in order from an object side. However, the number of lenses constituting the imaging lens system is not limited to five. As an example, the imaging lens system may further include a sixth lens disposed on an image side of the fifth lens. As another example, the imaging lens system may further include a seventh lens disposed on an image side of the sixth lens. The first to fifth lenses or the first to seventh lenses are disposed at certain gaps. For example, each of the lenses is not in contact with an image-side surface and an object-side surface of an adjacent lens in a paraxial region. In addition, an f number of the imaging lens system may be 2.08 or less.

The first lens has refractive power. For example, the first lens has positive refractive power. One surface of the first lens is concave. For example, an object-side surface of the first lens is concave. The first lens includes an aspherical surface. For example, both surfaces of the first lens may be aspherical. The first lens may have an inflection point. For example, an inflection point may be formed on at least one of the object-side surface and an image-side surface of the first lens. The first lens may be formed of a material having high light transmissivity and improved processability. For example, the first lens may be formed of plastic. The first lens has a certain Abbe number. For example, the Abbe number of the first lens may be 25 or more.

The second lens has refractive power. For example, the second lens may have negative refractive power. The second lens has a convex surface. For example, an object-side surface of the second lens may be convex. The second lens has an aspherical surface. For example, both surfaces of the second lens may be aspherical surfaces. The second lens may be formed of a material having high light transmissivity and improved processability. For example, the second lens may be formed of plastic. The second lens has a higher refractive index than the first lens. For example, the refractive index of the second lens may be 1.6 or more.

The third lens has refractive power. For example, the third lens has positive refractive power. At least one surface of the third lens is convex. For example, an object-side surface of the third lens may be convex. The third lens has an aspherical surface. For example, both surfaces of the third lens may be aspherical surfaces. The third lens may be formed of a material having high light transmissivity and improved processability. For example, the third lens may be formed of plastic. The third lens has a smaller refractive index than the second lens. For example, the refractive index of the third lens may be less than 1.6.

The fourth lens has refractive power. For example, the fourth lens has negative refractive power. An object-side surface or an image-side surface of the fourth lens is concave. The fourth lens has an aspherical surface. For example, both surfaces of the fourth lens may be aspherical. The fourth lens may have an inflection point. For example, an inflection point may be formed on at least one of the object-side surface and the image-side surface of the fourth lens. The fourth lens may be formed of a material having high light transmissivity and improved processability. For example, the fourth lens may be formed of plastic. The fourth lens has a certain refractive index. For example, the refractive index of the fourth lens may be 1.65 or more.

The fifth lens has refractive power. For example, the fifth lens may have negative refractive power. One surface of the fifth lens is concave. For example, an object-side surface of the fifth lens may be concave. The fifth lens may have a shape having an inflection point. For example, an inflection point may be formed on at least one of the object-side surface and an image-side surface of the fifth lens. The fifth lens has an aspherical surface. For example, both surfaces of the fifth lens may be aspherical surfaces. The fifth lens may be formed of a material having high light transmissivity and improved processability. For example, the fifth lens may be formed of plastic. The fifth lens always has a higher refractive index than the third lens.

The sixth lens has refractive power. For example, the sixth lens has positive refractive power. One surface of the sixth lens is convex. For example, an object-side surface of the sixth lens may be convex. The sixth lens may have a shape having an inflection point. For example, an inflection point may be formed on at least one of the object-side surface and an image-side surface of the sixth lens. The sixth lens has an aspherical surface. For example, both surfaces of the sixth lens may be aspherical surfaces. The sixth lens may be formed of a material having high light transmissivity and improved processability. For example, the sixth lens may be formed of plastic. The sixth lens has a smaller refractive index than the fifth lens. For example, the refractive index of the sixth lens may be less than 1.6.

The seventh lens has refractive power. For example, the seventh lens has negative refractive power. At least one surface of the seventh lens may be concave. For example, an image-side surface of the seventh lens may be concave. The seventh lens may have a shape having an inflection point. For example, one or more inflection points may be formed on at least one of an object-side surface and the image-side surface of the seventh lens. The seventh lens has an aspherical surface. For example, both surfaces of the seventh lens may be aspherical surfaces. The seventh lens may be formed of a material having high light transmissivity and improved processability. For example, the seventh lens may be formed of plastic. The seventh lens has a refractive index substantially similar to that of the sixth lens. For example, the refractive index of the seventh lens may be less than 1.6.

As described above, each of the first to seventh lenses has an aspherical surface. The aspherical surfaces of the first to seventh lenses may be represented by Equation 1 as below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad \text{Equation 1}$$

In equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface of the lens to an apex of the aspherical surface in an optical axis direction.

The imaging lens system further includes a filter, an image sensor, and a stop.

The filter is disposed on an object side of the image sensor. The filter may block certain wavelengths of light. For example, a filter may block infrared wavelengths of light. The image sensor forms an imaging plane on which light, refracted through the lenses, may be formed. The image sensor is configured to convert an optical signal into an electrical signal. The image sensor may be in the form of a CMOS-type image sensor. The stop is disposed to control the amount of light incident on the lens. For example, the stop may be disposed between the second lens and the third lens.

The imaging lens system may satisfy one or more of the following conditional expressions.

Conditional Expressions (CE 1 to CE 7)

| | |
|---|---|
| $100 < \text{FOV}$ | CE 1: |
| $-2.0 < (\text{Img}H/(f*\tan(\text{FOV}/2))-1)*100 < 2.0$ | CE 2: |
| $\text{TTL}/\text{Img}H < 1.5$ | CE 3: |
| $D12/D23 < 0.12$ | CE 4: |
| $1.2 < D23/D34$ | CE 5: |
| $-0.2 < f3/f2 < -0.04$ | CE 6: |
| $1.6 < \text{TTL}/f < 1.8$ | CE 7: |
| $3.0 < T\min < T\max < 5.0$ | CE 8: |
| $0.2 < T\max/\text{Img}H < 0.3$ | CE 9: |

In the above conditional expressions, "FOV" is a field of view of the imaging lens system, "ImgH" is a height of the imaging plane, "f" is a focal length of the imaging lens system, "D12" is a distance from an image-side surface of the first lens to an object-side surface of the second lens, "D23" is a distance from an image-side surface of the second lens to an object-side surface of the third lens, "D34" is a distance from an image-side surface of the third lens to an object-side surface of the fourth lens, "f2" is a focal length of the second lens, "f3" is a focal length of the third lens, "Tmax" is a thickness in a center of an optical axis of a lens having the highest thickness in the center of the optical axis, among lenses constituting the imaging lens system, and "Tmin" is a thickness in a center of an optical axis of a lens having a lowest thickness in the center of the optical axis, among the lenses constituting the imaging lens system.

Hereinafter, imaging lens systems according to various examples will be described.

An imaging lens system according to a first example will be described with reference to FIG. 1.

The imaging lens system 100 may include a first lens 110, a second lens 120, a third lens 130, a fourth lens 140, a fifth lens 150, a sixth lens 160, and a seventh lens 170.

The first lens 110 has positive refractive power. In the first lens 110, an object-side surface is concave and an image-side surface is convex. Inflection points are formed on the object-side surface and the image-side surface of the first lens 110. The second lens 120 has negative refractive power. In the second lens 120, an object-side surface is convex and an image-side surface is concave. The third lens 130 has positive refractive power. In the third lens 130, an object-side surface is convex and an image-side surface is convex. The fourth lens 140 has negative refractive power. In the fourth lens 140, an object-side surface is convex and an image-side surface is concave. Inflection points are formed on the object-side surface and the image-side surface of the fourth lens 140. The fifth lens 150 has negative refractive power. In the fifth lens 150, an object-side surface is concave and an image-side surface is convex. Inflection points are formed on the object-side surface and the image-side surface of the fifth lens 150. The sixth lens 160 has positive refractive power. In the sixth lens 160, an object-side surface is convex and an image-side surface is convex. Inflection points are formed on the object-side surface and the image-side surface of the sixth lens 160. The seventh lens 170 has negative refractive power. In the seventh lens 170, an object-side surface is concave and an image-side surface is concave. Inflection points are formed on the object-side surface and the image-side surface of the seventh lens 170.

The imaging lens system 100 may further include a filter 180 and an image sensor 190. The filter 180 is disposed between the seventh lens 170 and the image sensor 190. A stop ST is disposed between the second lens 120 and the third lens 130. The imaging lens system 100 has a field of view of 100.03 degrees.

Figure 2:
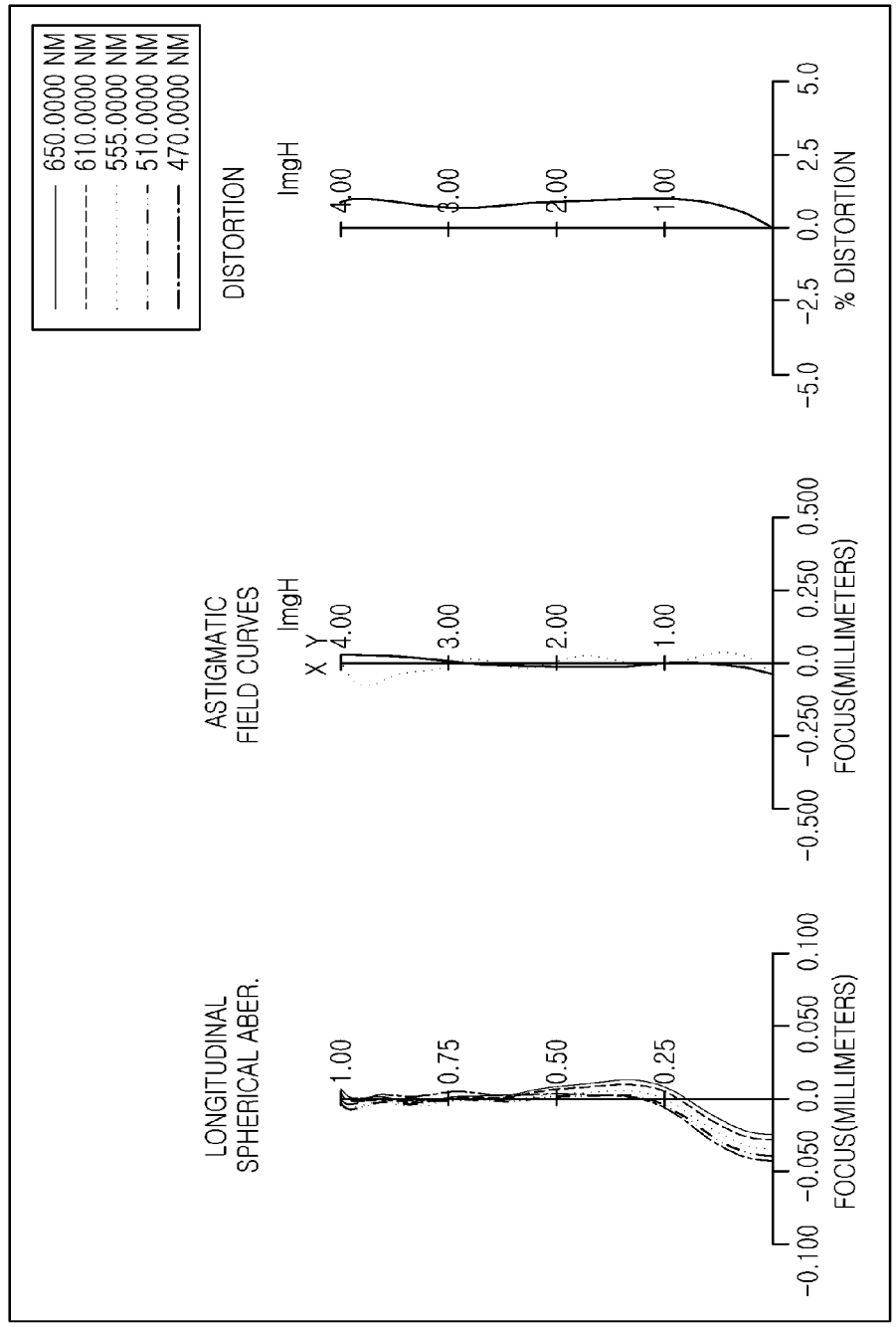
FIG. 2 is an aberration curve of the imaging lens system illustrated in FIG. 1.

The above-configured imaging lens system 100 exhibits aberration characteristics illustrated in FIG. 2. As illustrated in FIG. 2, the imaging lens system 100 may significantly reduce a spherical aberration, a curvature aberration, and a distortion aberration while having a field of view of 100 degrees or more. Table 1 and Table 2 illustrate lens characteristics and aspherical values of the imaging lens system 100.

TABLE 1

| Surface No. | Remark | Radius of Curvature | Thickness/ Distance | Refractive Index | Abbe Number | Effective Radius |
|---|---|---|---|---|---|---|
| S1 | First Lens | −4.764 | 0.470 | 1.570 | 37.357 | 1.780 |
| S2 | | −2.973 | 0.030 | | | 1.529 |
| S3 | Second Lens | 1.867 | 0.230 | 1.619 | 25.960 | 1.270 |
| S4 | | 1.582 | 0.438 | | | 1.053 |
| S5 | Stop | infinity | 0.060 | | | 0.885 |
| S6 | Third Lens | 8.720 | 0.775 | 1.546 | 56.114 | 0.977 |
| S7 | | −3.007 | 0.184 | | | 1.158 |
| S8 | Fourth Lens | 3.519 | 0.230 | 1.678 | 19.246 | 1.283 |
| S9 | | 2.962 | 0.344 | | | 1.432 |
| S10 | Fifth Lens | −1.397 | 0.230 | 1.667 | 20.353 | 1.497 |
| S11 | | −2.672 | 0.098 | | | 1.642 |
| S12 | Sixth Lens | 5.296 | 0.821 | 1.546 | 56.114 | 1.691 |
| S13 | | −1.099 | 0.352 | | | 1.942 |
| S14 | | −18.226 | 0.400 | 1.546 | 56.114 | 2.750 |
| S15 | Seventh Lens | 1.189 | 0.389 | | | 3.205 |
| S16 | Filter | infinity | 0.210 | 1.518 | 64.197 | 3.763 |
| S17 | | infinity | 0.606 | | | 3.842 |
| S18 | Imaging Plane | infinity | 0.034 | | | 4.000 |

TABLE 2

| Surface No. | R | K | A | B | C | D |
|---|---|---|---|---|---|---|
| S1 | −4.7643 | 4.1511 | 0.1421 | −0.1558 | 0.4105 | −1.0505 |
| S2 | −2.9729 | −39.1283 | 0.1239 | 0.0264 | −1.1159 | 4.8498 |
| S3 | 1.8671 | −10.8346 | 0.0767 | −0.0665 | −0.8452 | 2.9541 |
| S4 | 1.5820 | −6.2937 | −0.2398 | 1.8699 | −18.6841 | 145.9078 |
| S6 | 8.7200 | 71.1361 | −0.0194 | −0.0277 | −0.3624 | 4.3215 |
| S7 | −3.0068 | 4.2188 | −0.1397 | −0.7011 | 8.7645 | −57.3486 |
| S8 | 3.5191 | −58.5347 | −0.2005 | 0.3851 | −6.3390 | 37.7137 |
| S9 | 2.9616 | −3.1119 | −0.0505 | −0.5718 | 2.5043 | −8.5813 |

TABLE 2-continued

| | | | | | | |
|---|---|---|---|---|---|---|
| S10 | −1.3969 | −13.1791 | −0.3486 | 2.0299 | −9.5016 | 34.4080 |
| S11 | −2.6717 | −3.3228 | −0.0808 | 0.1067 | 0.2569 | −2.5591 |
| S12 | 5.2959 | −98.6532 | −0.1984 | 0.4411 | −1.2646 | 2.9349 |
| S13 | −1.0992 | −1.7406 | 0.1564 | −0.4891 | 1.3376 | −2.9984 |
| S14 | −18.2257 | 0.0000 | −0.0422 | −0.1879 | 0.4401 | −0.5350 |
| S15 | 1.1886 | −3.8777 | −0.1754 | 0.1609 | −0.1107 | 0.0559 |

| Surface No. | E | F | G | H | J |
|---|---|---|---|---|---|
| S1 | 1.9492 | −2.5362 | 2.3463 | −1.5624 | 0.7511 |
| S2 | −12.1584 | 20.4288 | −24.1899 | 20.5986 | −12.6633 |
| S3 | −3.7175 | −3.6817 | 22.6586 | −42.9487 | 48.0268 |
| S4 | −815.2217 | 3235.5687 | −9211.291 | 18950.991 | −28169.75 |
| S6 | −27.3864 | 122.0517 | −414.3108 | 1053.0258 | −1930.636 |
| S7 | 252.0694 | −779.2777 | 1729.4105 | −2781.659 | 3242.7152 |
| S8 | −135.1075 | 329.6431 | −573.3994 | 724.5027 | −666.7108 |
| S9 | 23.0903 | −44.8330 | 61.6010 | −60.0796 | 41.5948 |
| S10 | −90.6749 | 173.2562 | −240.2417 | 241.6892 | −175.6878 |
| S11 | 9.1090 | −19.6524 | 28.7023 | −29.3198 | 21.0568 |
| S12 | −4.7612 | 5.1321 | −3.4043 | 0.9995 | 0.3796 |
| S13 | 4.9675 | −5.8607 | 4.8969 | −2.8961 | 1.2080 |
| S14 | 0.4198 | −0.2266 | 0.0868 | −0.0239 | 0.0048 |
| S15 | −0.0212 | 0.0062 | −0.0014 | 0.0003 | 0.0000 |

Figure 3:
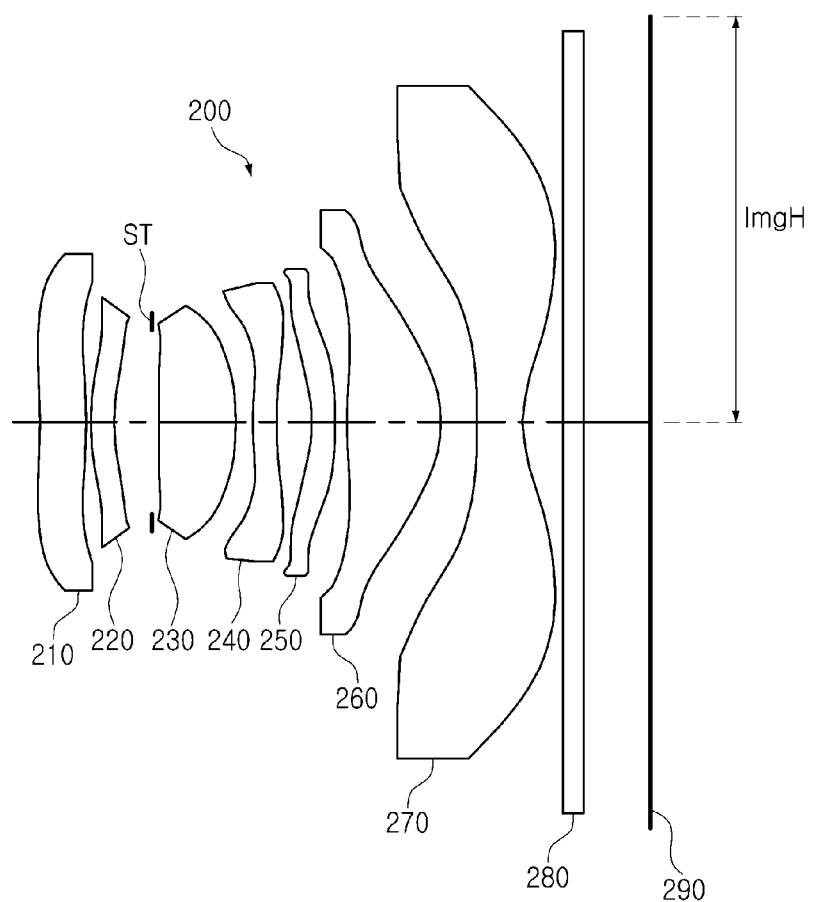
FIG. 3 illustrates a configuration of an imaging lens system according to a second example.

Hereinafter, an imaging lens system according to the second example will be described with reference to FIG. 3.

The imaging lens system 200 may include a first lens 210, a second lens 220, a third lens 230, a fourth lens 240, a fifth lens 250, and a sixth lens 260, and a seventh lens 270.

The first lens 210 has positive refractive power. In the first lens 210, an object-side surface is concave and an image-side surface is convex. Inflection points are formed on an object-side surface and an image-side surface of the first lens 210. The second lens 220 has negative refractive power. In the second lens 220, an object-side surface is convex and the image-side surface is concave. The third lens 230 has positive refractive power. In the third lens 230, an object-side surface is convex and an image-side surface is convex. The fourth lens 240 has negative refractive power. In the fourth lens 240, an object-side surface is convex and an image-side surface is concave. Inflection points are formed on the object-side surface and the image-side surface of the fourth lens 240. The fifth lens 250 has negative refractive power. In the fifth lens 250, an object-side surface is concave and an image-side surface is convex. Inflection points are formed on the object-side surface and an image-side surface of the fifth lens 250. The sixth lens 260 has positive refractive power. In the sixth lens 260, an object-side surface is convex and an image-side surface is convex. Inflection points are formed on the object-side surface and the image-side surface of the sixth lens 260. The seventh lens 270 has negative refractive power. In the seventh lens 270, an object-side surface is concave and an image-side surface is concave. Inflection points are formed on the object-side surface and the image-side surface of the seventh lens 270.

The imaging lens system 200 may further include a filter 280 and an image sensor 290. The filter 280 is disposed between the seventh lens 270 and the image sensor 290. A stop ST is disposed between the second lens 220 and the third lens 230. The imaging lens system 200 has a field of view of 100.05 degrees.

Figure 4:
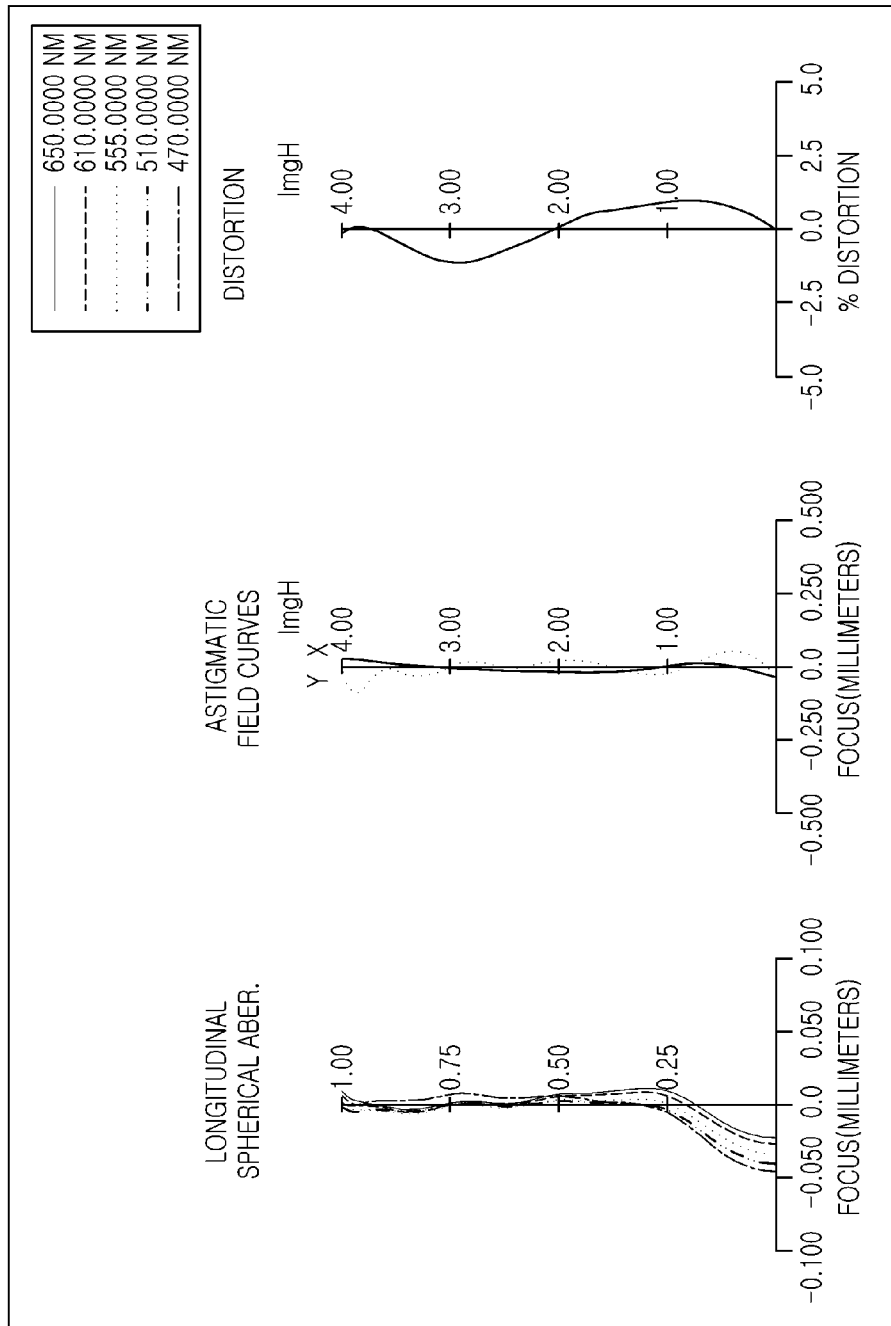
FIG. 4 is an aberration curve of the imaging lens system illustrated in FIG. 3.

The above-configured imaging lens system 200 exhibits aberration characteristics illustrated in FIG. 4. As illustrated in FIG. 4, the imaging lens system 200 may significantly reduce a spherical aberration, a curvature aberration, and a distortion aberration while having a field of view of 100 degrees or more. Tables 3 and 4 illustrate lens characteristics and aspherical values of the imaging lens system 200.

TABLE 3

| Surface No. | Remark | Radius of Curvature | Thickness/ Distance | Refractive Index | Abbe Number | Effective Radius |
|---|---|---|---|---|---|---|
| S1 | First Lens | −5.128 | 0.446 | 1.570 | 37.357 | 1.650 |
| S2 | | −3.651 | 0.041 | | | 1.389 |
| S3 | Second Lens | 2.101 | 0.230 | 1.619 | 25.960 | 1.226 |
| S4 | | 1.947 | 0.365 | | | 1.035 |
| S5 | Stop | infinity | 0.058 | | | 0.900 |
| S6 | Third Lens | 10.780 | 0.750 | 1.546 | 56.114 | 0.973 |
| S7 | | −2.947 | 0.166 | | | 1.149 |
| S8 | Fourth Lens | 3.806 | 0.230 | 1.678 | 19.246 | 1.258 |
| S9 | | 3.164 | 0.335 | | | 1.415 |
| S10 | Fifth Lens | −1.573 | 0.230 | 1.656 | 21.525 | 1.469 |
| S11 | | −3.175 | 0.111 | | | 1.574 |
| S12 | Sixth Lens | 5.247 | 0.902 | 1.546 | 56.114 | 1.726 |
| S13 | | −1.146 | 0.361 | | | 2.077 |
| S14 | Seventh Lens | −39.578 | 0.430 | 1.546 | 56.114 | 2.800 |
| S15 | | 1.142 | 0.395 | | | 3.298 |
| S16 | Filter | infinity | 0.210 | 1.518 | 64.197 | 3.775 |
| S17 | | infinity | 0.606 | | | 3.843 |
| S18 | Imaging Plane | infinity | 0.034 | | | 4.000 |

TABLE 4

| Surface No. | R | K | A | B | C | D |
|---|---|---|---|---|---|---|
| S1 | −5.1283 | 3.3942 | 0.1368 | −0.2438 | 0.9979 | −3.1731 |
| S2 | −3.6514 | −32.5054 | 0.0390 | 0.8617 | −6.2655 | 26.7813 |
| S3 | 2.1014 | −17.6383 | −0.0039 | 0.3859 | −2.8176 | 6.9772 |
| S4 | 1.9468 | −8.4532 | −0.2711 | 2.5413 | −29.2065 | 237.7909 |
| S6 | 10.7797 | 91.4673 | −0.0359 | 0.3752 | −5.3111 | 42.9605 |
| S7 | −2.9467 | 4.1341 | −0.1171 | −1.6410 | 21.7517 | −155.5773 |
| S8 | 3.8064 | −62.9785 | −0.2614 | 0.9407 | −10.4039 | 63.0068 |
| S9 | 3.1643 | −2.6096 | −0.0633 | −0.6195 | 3.4712 | −12.9264 |
| S10 | −1.5729 | −13.7822 | −0.1628 | 0.5531 | −4.1836 | 24.4055 |
| S11 | −3.1751 | −2.4618 | 0.2075 | −2.1417 | 8.9216 | −23.9476 |
| S12 | 5.2466 | −80.6180 | 0.0717 | −1.0850 | 3.7561 | −7.8529 |
| S13 | −1.1462 | −1.7965 | 0.1543 | −0.4632 | 1.0325 | −1.8351 |
| S14 | −39.5782 | 0.0000 | −0.0996 | −0.1849 | 0.5587 | −0.7041 |
| S15 | 1.1421 | −3.5557 | −0.2168 | 0.2134 | −0.1408 | 0.0618 |

| Surface No. | E | F | G | H | J |
|---|---|---|---|---|---|
| S1 | 6.9191 | −10.4862 | 11.2934 | −8.7617 | 4.9111 |
| S2 | −77.0050 | 155.9587 | −227.6700 | 242.0542 | −187.3871 |
| S3 | 3.2882 | −76.2400 | 256.8115 | −490.6283 | 613.6067 |
| S4 | −1341.39 | 5345.2897 | −15317.90 | 31875.21 | −48168.31 |
| S6 | −226.3169 | 809.4846 | −2007.12 | 3457.4171 | −4056.43 |
| S7 | 721.8032 | −2297.59 | 5171.1144 | −8360.26 | 9746.7776 |
| S8 | −243.5512 | 644.2341 | −1204.84 | 1616.8332 | −1560.56 |
| S9 | 34.6202 | −66.2155 | 90.6790 | −89.2436 | 62.8920 |
| S10 | −84.0460 | 186.4338 | −282.3257 | 300.9473 | −228.4983 |
| S11 | 46.6773 | −69.1753 | 78.5496 | −67.5708 | 43.2134 |
| S12 | 11.5611 | −12.7009 | 10.5902 | −6.6861 | 3.1572 |
| S13 | 2.5884 | −2.7294 | 2.0775 | −1.1295 | 0.4368 |
| S14 | 0.5337 | −0.2695 | 0.0951 | −0.0240 | 0.0044 |
| S15 | −0.0183 | 0.0036 | −0.0004 | 0.0000 | 0.0000 |

Figure 5:
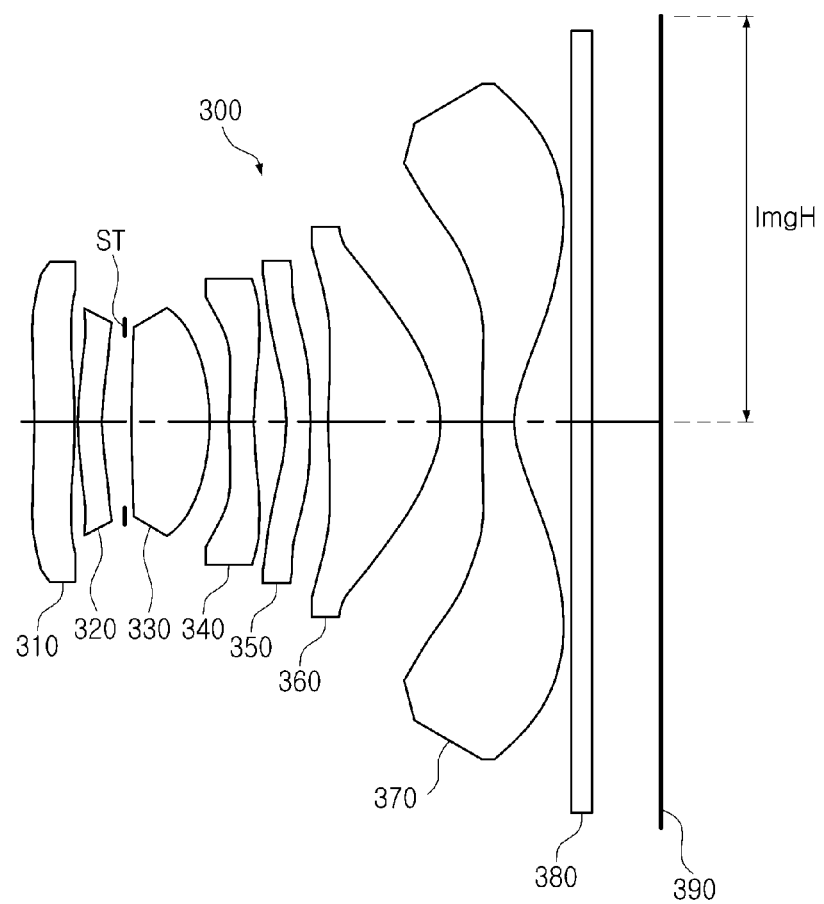
FIG. 5 illustrates a configuration of an imaging lens system according to a third example.

Hereinafter, an imaging lens system according to a third example will be described with reference to FIG. 5.

The imaging lens system 300 may include a first lens 310, a second lens 320, a third lens 330, a fourth lens 340, a fifth lens 350, and a sixth lens 360, and a seventh lens 370.

The first lens 310 has positive refractive power. In the first lens 310, an object-side surface is concave and an image-side surface is convex. Inflection points are formed on the object-side surface and the image-side surface of the first lens 310. The second lens 320 has negative refractive power. In the second lens 320, an object-side surface is convex and an image-side surface is concave. The third lens 330 has positive refractive power. In the third lens 330, an object-side surface is convex and an image-side surface is convex. The fourth lens 340 has negative refractive power. In the fourth lens 340, an object-side surface is convex and an image-side surface is concave. Inflection points are formed on the object-side surface and the image-side surface of the fourth lens 340. The fifth lens 350 has negative refractive power. In the fifth lens 350, an object-side surface is concave and an image-side surface is convex. Inflection points are formed on the object-side surface and the image-side surface of the fifth lens 350. The sixth lens 360 has positive refractive power. In the sixth lens 360, an object-side surface is convex and an image-side surface is convex. Inflection points are formed on the object-side surface and the image-side surface of the sixth lens 360. The seventh lens 370 has negative refractive power. In the seventh lens 370, an object-side surface is convex and an image-side surface is concave. Inflection points are formed on the object-side surface and the image-side surface of the seventh lens 370.

The imaging lens system 300 may further include a filter 380 and an image sensor 390. The filter 380 is disposed between the seventh lens 370 and the image sensor 390. A stop ST is disposed between the second lens 320 and the third lens 330. The imaging lens system 300 has a field of view of 100.02 degrees.

Figure 6:
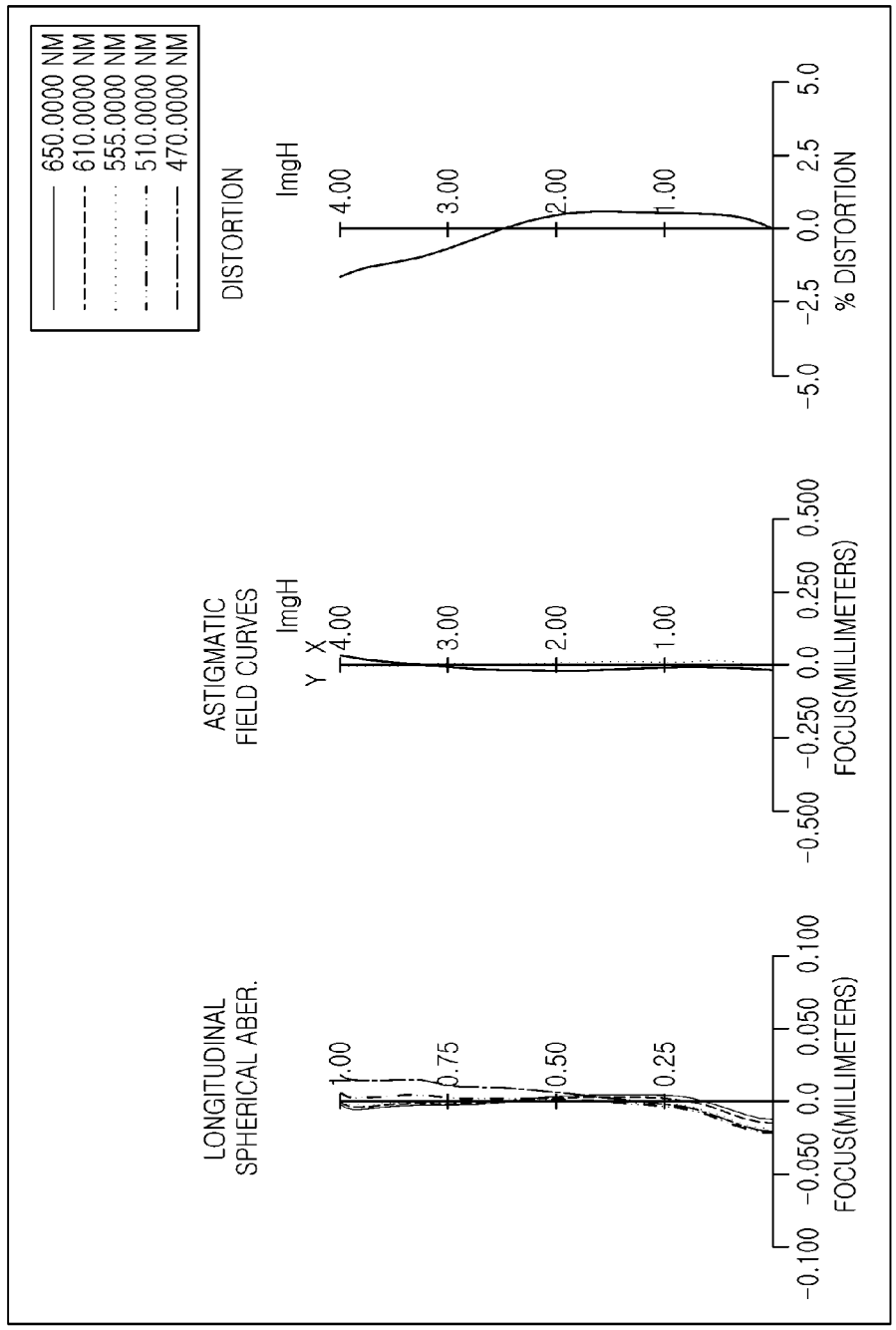
FIG. 6 is an aberration curve of the imaging lens system illustrated in FIG. 5.

The above-configured imaging lens system 300 exhibits aberration characteristics illustrated in FIG. 6. As illustrated in FIG. 6, the imaging lens system 300 may significantly reduce a spherical aberration, a curvature aberration, and a distortion aberration while having a field of view of 100 degrees or more. Table 5 and Table 6 illustrate lens characteristics and aspherical values of the imaging lens system 300.

TABLE 5

| Surface No. | Remark | Radius of Curvature | Thickness/ Distance | Refractive Index | Abbe Number | Effective Radius |
|---|---|---|---|---|---|---|
| S1 | First Lens | −5.492 | 0.371 | 1.619 | 25.960 | 1.531 |
| S2 | | −3.494 | 0.030 | | | 1.259 |
| S3 | Second Lens | 2.742 | 0.230 | 1.678 | 19.246 | 1.090 |
| S4 | | 2.278 | 0.218 | | | 0.946 |
| S5 | Stop | infinity | 0.060 | | | 0.819 |
| S6 | Third Lens | 9.527 | 0.729 | 1.546 | 56.114 | 0.906 |
| S7 | | −2.937 | 0.186 | | | 1.091 |
| S8 | Fourth Lens | 4.309 | 0.230 | 1.667 | 20.353 | 1.188 |

TABLE 5-continued

| Surface No. | Remark | Radius of Curvature | Thickness/ Distance | Refractive Index | Abbe Number | Effective Radius |
|---|---|---|---|---|---|---|
| S9 | | 3.300 | 0.306 | | | 1.362 |
| S10 | Fifth Lens | −1.947 | 0.236 | 1.678 | 19.246 | 1.407 |
| S11 | | −4.946 | 0.166 | | | 1.540 |
| S12 | Sixth Lens | 8.734 | 1.055 | 1.546 | 56.114 | 1.679 |
| S13 | | −0.983 | 0.390 | | | 1.863 |
| S14 | Seventh Lens | 17.092 | 0.300 | 1.546 | 56.114 | 2.650 |
| S15 | | 0.993 | 0.543 | | | 3.228 |
| S16 | Filter | infinity | 0.210 | 1.518 | 64.197 | 3.659 |
| S17 | | infinity | 0.621 | | | 3.735 |
| S18 | Imaging Plane | infinity | 0.019 | | | 4.000 |

TABLE 6

| Surface No. | R | K | A | B | C | D |
|---|---|---|---|---|---|---|
| S1 | −5.1283 | 5.8138 | 0.1212 | −0.0643 | −0.1041 | 0.7639 |
| S2 | −3.6514 | −33.9352 | 0.2611 | −1.2724 | 6.4596 | −25.3160 |
| S3 | 2.1014 | −21.5735 | 0.1259 | −1.1677 | 5.8277 | −22.4244 |
| S4 | 1.9468 | −8.5088 | −0.1561 | −0.4086 | 10.5714 | −111.1436 |
| S6 | 10.7797 | 85.4549 | −0.0215 | −0.2108 | 2.1468 | −12.3613 |
| S7 | −2.9467 | 3.9587 | −0.1321 | −0.2376 | 3.9102 | −26.9326 |
| S8 | 3.8064 | −34.3248 | −0.2219 | 0.0641 | −1.7265 | 13.7066 |
| S9 | 3.1643 | −0.9785 | −0.0661 | −0.2854 | 0.8771 | −1.6201 |
| S10 | −1.5729 | −18.1493 | −0.1462 | 0.4212 | −1.2260 | 3.1222 |
| S11 | −3.1751 | −1.4985 | −0.0275 | 0.0356 | −0.4371 | 1.6608 |
| S12 | 5.2466 | −99.0000 | −0.0974 | 0.2219 | −0.7037 | 1.5760 |
| S13 | −1.1462 | −1.6932 | 0.2104 | −0.4630 | 0.8962 | −1.5728 |
| S14 | −39.5782 | 0.0000 | 0.0913 | −0.3938 | 0.5798 | −0.5569 |
| S15 | 1.1421 | −2.0639 | −0.2328 | 0.1879 | −0.1160 | 0.0542 |

| Surface No. | E | F | G | H | J |
|---|---|---|---|---|---|
| S1 | −2.2406 | 4.1773 | −5.3850 | 4.9432 | −3.2568 |
| S2 | 73.5640 | −158.0093 | 251.4624 | −296.4654 | 257.3609 |
| S3 | 62.3405 | −124.2735 | 177.9233 | −183.8039 | 140.1634 |
| S4 | 745.4014 | −3446.3 | 11337.2 | −26910.7 | 46182.3 |
| S6 | 27.3196 | 104.1103 | −1044.1 | 4056.5246 | −9604.0 |
| S7 | 123.1143 | −396.1034 | 915.9745 | −1536.5 | 1868.6911 |
| S8 | −60.7710 | 178.2167 | −366.3946 | 540.6305 | −575.8851 |
| S9 | 2.4755 | −3.7509 | 5.5484 | −6.9165 | 6.4883 |
| S10 | −5.1106 | 4.6650 | −0.6567 | −4.2377 | 6.1937 |
| S11 | −3.6615 | 5.4714 | −5.7321 | 4.1961 | −2.0759 |
| S12 | −2.4522 | 2.6703 | −2.0353 | 1.0658 | −0.3611 |
| S13 | 2.2441 | −2.4489 | 1.9968 | −1.2057 | 0.5348 |
| S14 | 0.3767 | −0.1844 | 0.0662 | −0.0175 | 0.0034 |
| S15 | −0.0192 | 0.0052 | −0.0011 | 0.0002 | 0.0000 |

Figure 7:
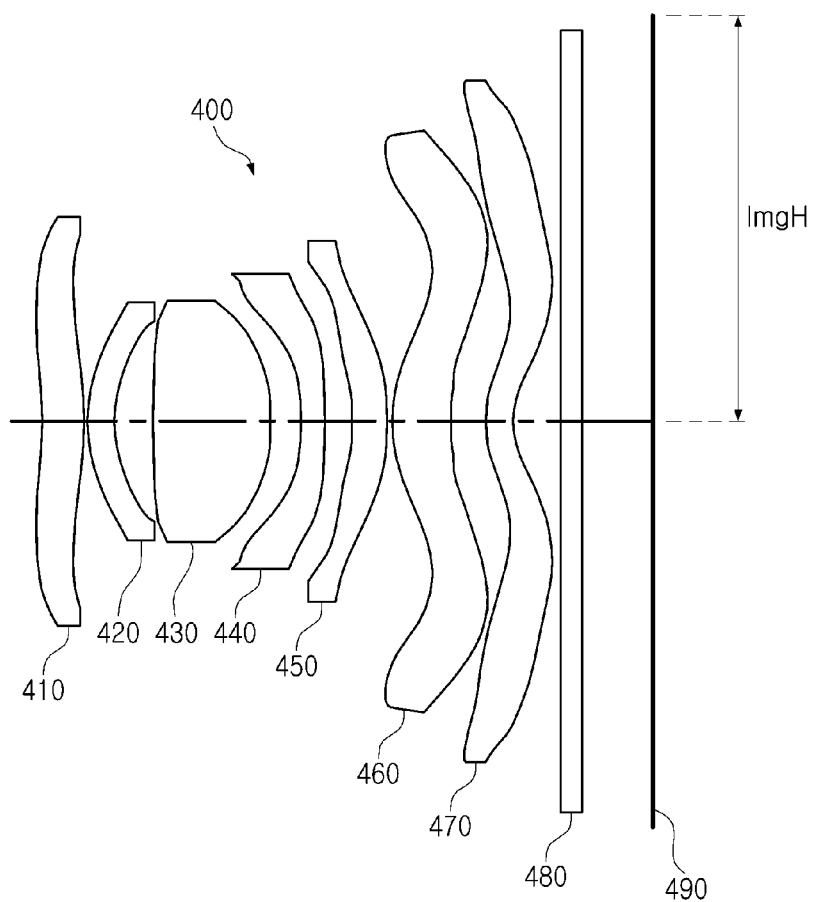
FIG. 7 illustrates a configuration of an imaging lens system according to a fourth example.

Hereinafter, an imaging lens system according to a fourth example will be described with reference to FIG. 7.

The imaging lens system 400 may include a first lens 410, a second lens 420, a third lens 430, a fourth lens 440, a fifth lens 450, a sixth lens 460, and a seventh lens 470.

The first lens 410 has positive refractive power. In the first lens 410, an object-side surface is concave and an image-side surface is convex. Inflection points are formed on the object-side surface and the image-side surface of the first lens 410. The second lens 420 has negative refractive power. In the second lens 420, an object-side surface is convex and an image-side surface is concave. The third lens 430 has positive refractive power. In the third lens 430, and an object-side surface is convex and an image-side surface is convex. The fourth lens 440 has negative refractive power. In the fourth lens 440, an object-side surface is concave and an image-side surface is convex. Inflection points are formed on the object-side surface and the image-side surface of the fourth lens 440. The fifth lens 450 has negative refractive power. In the fifth lens 450, an object-side surface is concave and an image-side surface is convex. Inflection points are formed on the object-side surface and the image-side surface of the fifth lens 450. The sixth lens 460 has positive refractive power. In the sixth lens 460, the object-side surface is convex and the image-side surface is concave. Inflection points are formed on the object-side surface and the image-side surface of the sixth lens 460. The seventh lens 470 has negative refractive power. In the seventh lens 470, an object-side surface is convex and an image-side surface is concave. Inflection points are formed on the object-side surface and the image-side surface of the seventh lens 470.

The imaging lens system 400 may further include a filter 480 and an image sensor 490. The filter 480 is disposed between the seventh lens 470 and the image sensor 490. A stop (not illustrated) may be disposed between the third lens 430 and the fourth lens 440. The imaging lens system 400 has a field of view of 100.40 degrees.

Figure 8:
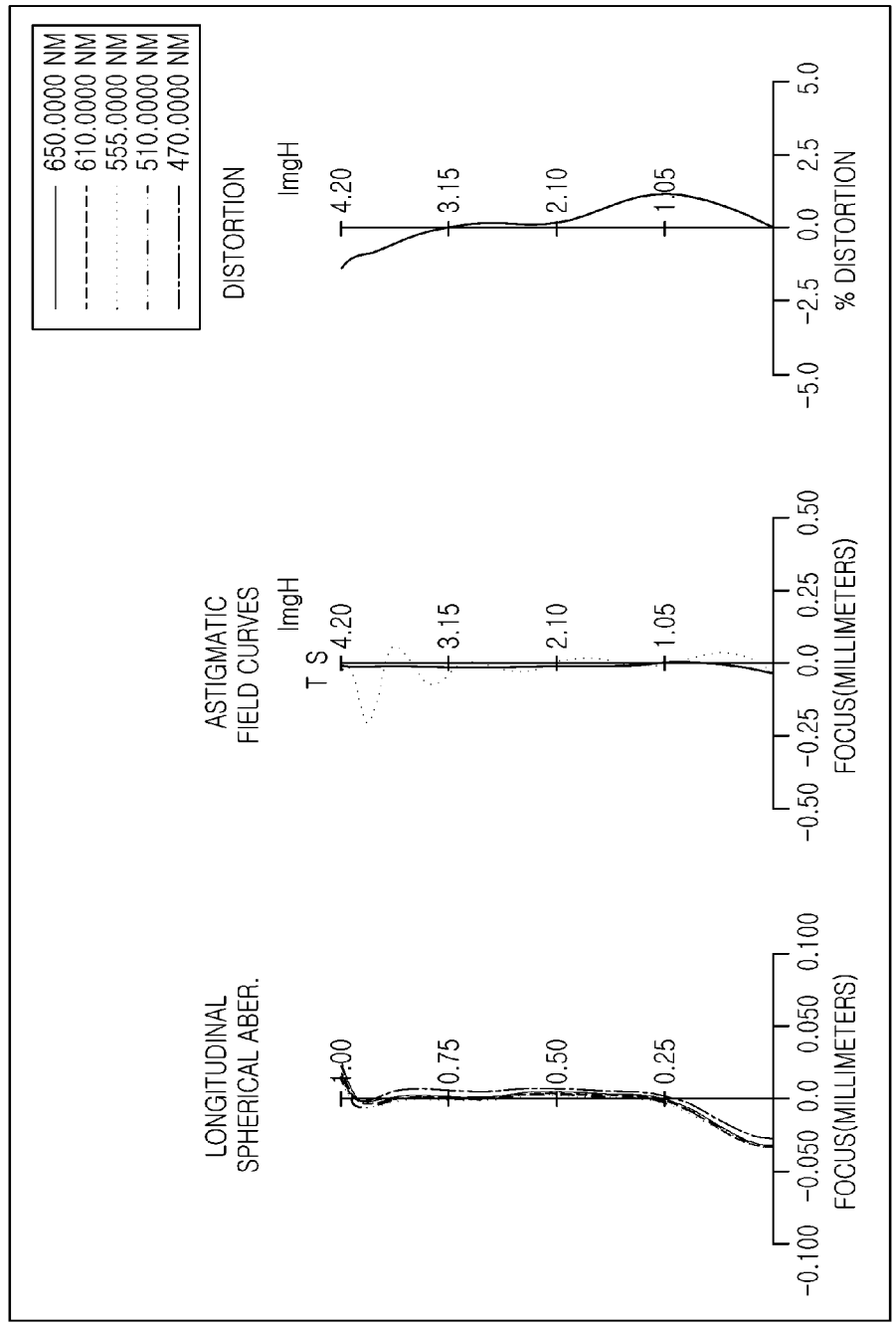
FIG. 8 is an aberration curve of the imaging lens system illustrated in FIG. 7.

The above-configured optical system 400 exhibits aberration characteristics illustrated in FIG. 8. As illustrated in FIG. 8, the imaging lens system 400 may significantly reduce a spherical aberration, a curvature aberration, and a distortion aberration while having a field of view of 100 degrees or more. Table 7 and Table 8 illustrate lens characteristics and aspherical values of the imaging lens system 400.

Figure 9:
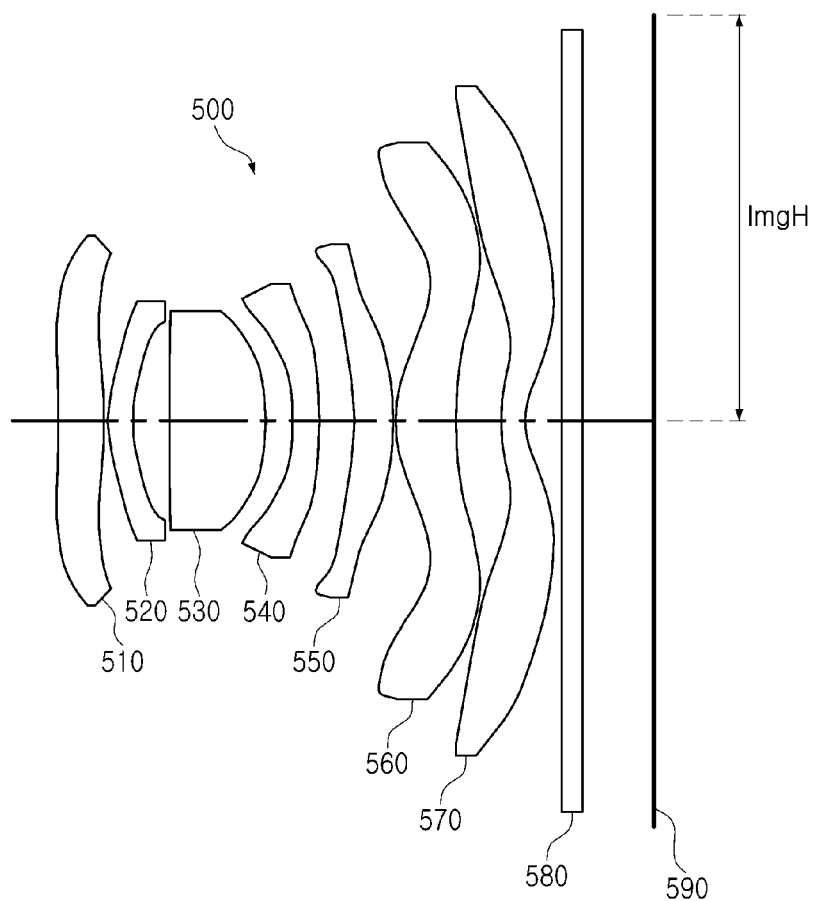
FIG. 9 illustrates a configuration of an imaging lens system according to a fifth example.

Hereinafter, an optical system according to a fifth example will be described with reference to FIG. 9.

The imaging lens system 500 may include a first lens 510, a second lens 520, a third lens 530, a fourth lens 540, a fifth lens 550, a sixth lens 560, and a seventh lens 570.

The first lens 510 has positive refractive power. In the first lens 510, an object-side surface is concave and an image-side surface is convex. Inflection points are formed on the object-side surface and the image-side surface of the first lens 510. The second lens 520 has negative refractive power.

TABLE 7

| Surface No. | Remark | Radius of Curvature | Thickness/ Distance | Refractive Index | Abbe Number | Effective Radius |
|---|---|---|---|---|---|---|
| S1 | First Lens | −3.662 | 0.401 | 1.546 | 56.095 | 1.990 |
| S2 | | −2.305 | 0.030 | | | 1.804 |
| S3 | Second Lens | 1.431 | 0.259 | 1.619 | 25.960 | 1.160 |
| S4 | | 1.186 | 0.370 | | | 0.965 |
| S5 | Third Lens (Stop | 9.725 | 1.127 | 1.546 | 56.095 | 0.850 |
| S6 | | −2.139 | 0.288 | | | 1.179 |
| S7 | Fourth Lens | −2.914 | 0.233 | 1.678 | 19.246 | 1.275 |
| S8 | | −7.272 | 0.258 | | | 1.433 |
| S9 | Fifth Lens | −1.509 | 0.335 | 1.619 | 25.960 | 1.552 |
| S10 | | −3.205 | 0.050 | | | 1.752 |
| S11 | Sixth Lens | 1.403 | 0.565 | 1.546 | 56.095 | 2.628 |
| S12 | | 17.066 | 0.328 | | | 2.882 |
| S13 | Seventh Lens | 0.961 | 0.263 | 1.546 | 56.095 | 3.200 |
| S14 | | 0.704 | 0.453 | | | 3.308 |
| S15 | Filter | infinity | 0.210 | 1.518 | 64.197 | 3.726 |
| S16 | | infinity | 0.656 | | | 3.801 |
| S17 | Imaging Plane | infinity | 0.034 | | | 4.000 |

TABLE 8

| Surface No. | R | K | A | B | C | D |
|---|---|---|---|---|---|---|
| S1 | −3.6615 | 1.1235 | 0.1514 | −0.1174 | 0.0843 | −0.0433 |
| S2 | −2.3052 | −0.8176 | 0.3809 | −0.8379 | 1.7313 | −2.8089 |
| S3 | 1.4313 | −1.2605 | −0.0008 | 0.0255 | −1.7506 | 12.0070 |
| S4 | 1.1856 | −0.5622 | −0.3667 | 1.5243 | −9.4402 | 59.4008 |
| S5 | 9.7246 | 0.0000 | −0.0118 | 0.0401 | −0.0941 | 0.0631 |
| S6 | −2.1393 | −1.6153 | 0.0016 | −1.9220 | 16.4511 | −88.4219 |
| S7 | −2.9140 | 2.7478 | −0.1561 | −0.4344 | 0.9815 | −0.9053 |
| S8 | −7.2722 | 23.5869 | 0.0693 | −0.3965 | 0.6199 | −0.5855 |
| S9 | −1.5094 | −1.4248 | 0.3583 | −0.2424 | −0.1477 | 0.5589 |
| S10 | −3.2052 | −6.7830 | −0.2139 | 0.0823 | 0.5186 | −1.6591 |
| S11 | 1.4029 | −1.2611 | −0.1052 | 0.1303 | −0.2256 | 0.2104 |
| S12 | 17.0663 | 0.0000 | 0.4532 | −0.5252 | 0.3261 | −0.1233 |
| S13 | 0.9611 | −2.5892 | −0.1885 | −0.1034 | 0.3214 | −0.3400 |
| S14 | 0.7039 | −1.0351 | −0.6827 | 0.5537 | −0.3769 | 0.2019 |

| Surface No. | E | F | G | H | J |
|---|---|---|---|---|---|
| S1 | 0.0149 | −0.0032 | 0.0004 | 0.0000 | 0.0000 |
| S2 | 3.4140 | −3.0628 | 2.0159 | −0.9665 | 0.3327 |
| S3 | −46.9195 | 120.7046 | −213.6173 | 263.4432 | −225.1094 |
| S4 | −307.5655 | 1183.8722 | −3267.0 | 6369.1026 | −8636.8 |
| S5 | 0.0000 | 0.0000 | 0.0000 | 0.0000 | 0.0000 |
| S6 | 318.8118 | −797.3015 | 1408.8229 | −1769.7 | 1569.3064 |
| S7 | 0.4233 | −0.0769 | 0.0000 | 0.0000 | 0.0000 |
| S8 | 0.3241 | −0.0948 | 0.0113 | 0.0002 | 0.0000 |
| S9 | −0.6630 | 0.4241 | −0.1535 | 0.0295 | −0.0023 |
| S10 | 2.8081 | −2.9895 | 2.0869 | −0.9684 | 0.2963 |
| S11 | −0.1173 | 0.0404 | −0.0082 | 0.0007 | 0.0001 |
| S12 | 0.0246 | 0.0004 | −0.0017 | 0.0005 | −0.0001 |
| S13 | 0.2148 | −0.0894 | 0.0257 | −0.0052 | 0.0008 |
| S14 | −0.0840 | 0.0270 | −0.0066 | 0.0012 | −0.0002 |

In the second lens 520, an object-side surface is convex and an image-side surface is concave. The third lens 530 has positive refractive power. In the third lens 530, an object-side surface is convex and an image-side surface is convex. The fourth lens 540 has negative refractive power. In the fourth lens 540, an object-side surface is concave and an image-side surface is convex. Inflection points are formed on the object-side surface and the image-side surface of the fourth lens 540. The fifth lens 550 has negative refractive power. In the fifth lens 550, an object-side surface is concave and an image-side surface is convex. Inflection points are formed on the object-side surface and the image-side surface of the fifth lens 550. The sixth lens 560 has positive refractive power. In the sixth lens 560, an object-side surface is convex and an image-side surface is convex. Inflection points are formed on the object-side surface and the image-side surface of the sixth lens 560. The seventh lens 570 has negative refractive power. In the seventh lens 570, an object-side surface is convex and an image-side surface is concave. Inflection points are formed on the object-side surface and the image-side surface of the seventh lens 570.

The imaging lens system 500 may further include a filter 580 and an image sensor 590. The filter 580 is disposed between the seventh lens 570 and the image sensor 590. A stop (not illustrated) may be disposed between the third lens 530 and the fourth lens 540. The imaging lens system 500 has a field of view of 100.30 degrees.

Figure 10:
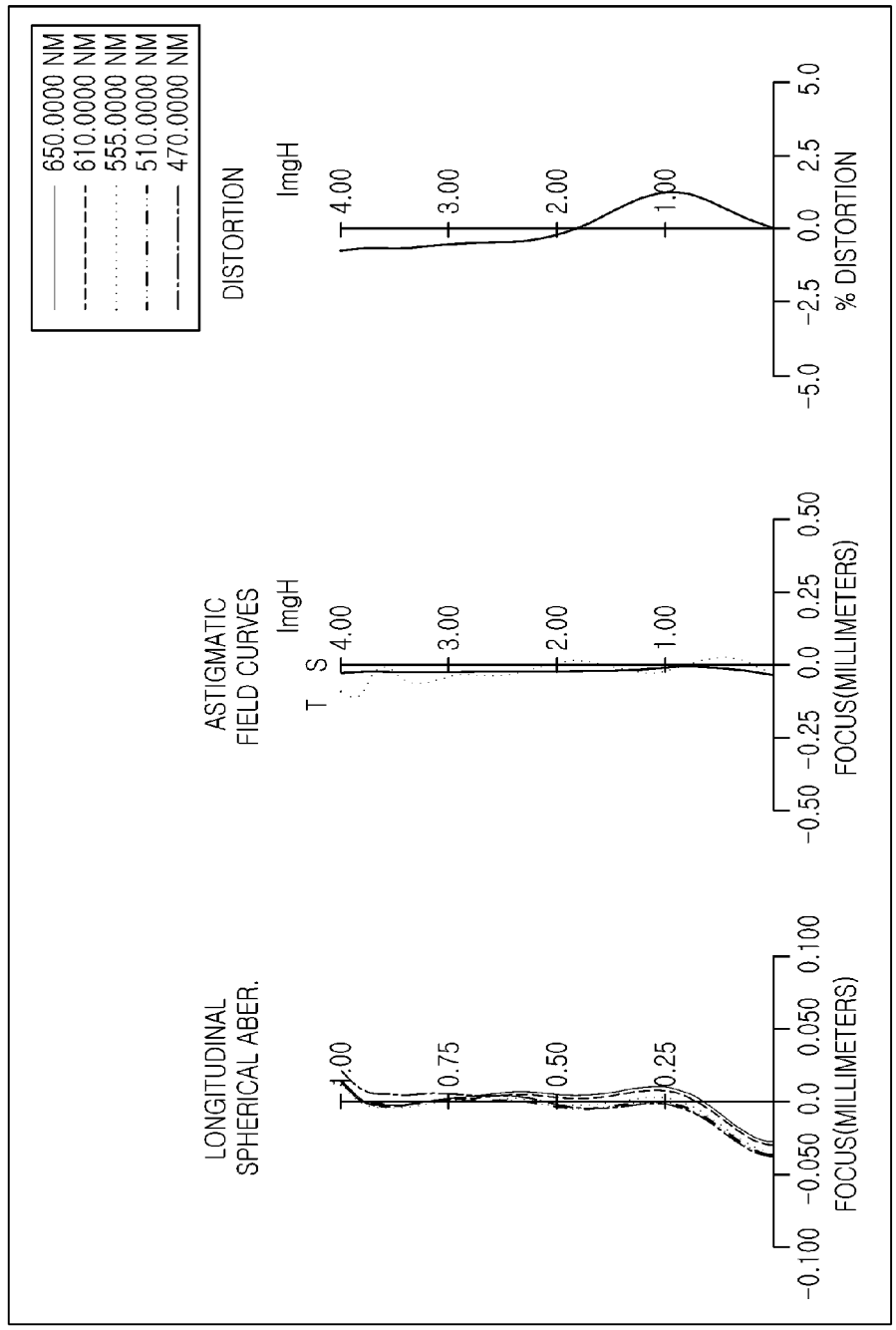
FIG. 10 is an aberration curve of the imaging lens system illustrated in FIG. 9.

The above-configured imaging lens system 500 exhibits aberration characteristics illustrated in FIG. 10. As illustrated in FIG. 10, the imaging lens system 500 may significantly reduce a spherical aberration, a curvature aberration, and a distortion aberration while having a field of view of 100 degrees or more. Table 9 and Table 10 illustrate lens characteristics and aspherical values of the imaging lens system 500.

TABLE 9

| Surface No. | Remark | Radius of Curvature | Thickness/ Distance | Refractive Index | Abbe Number | Effective Radius |
|---|---|---|---|---|---|---|
| S1 | First Lens | −5.223 | 0.433 | 1.546 | 56.095 | 1.800 |
| S2 |  | −2.885 | 0.041 |  |  | 1.604 |
| S3 |  | 1.752 | 0.238 | 1.619 | 25.960 | 1.160 |
| S4 | Second Lens | 1.505 | 0.349 |  |  | 0.965 |
| S5 | Third Lens (Stop) | 15.354 | 0.919 | 1.546 | 56.095 | 0.790 |
| S6 |  | −2.227 | 0.262 |  |  | 1.070 |
| S7 | Fourth Lens | −2.980 | 0.253 | 1.678 | 19.246 | 1.152 |
| S8 |  | −7.004 | 0.341 |  |  | 1.333 |
| S9 | Fifth Lens | −1.663 | 0.363 | 1.570 | 37.357 | 1.574 |
| S10 |  | −3.910 | 0.030 |  |  | 1.791 |
| S11 | Sixth Lens | 1.291 | 0.576 | 1.546 | 56.095 | 2.481 |
| S12 |  | −22.198 | 0.438 |  |  | 2.810 |
| S13 | Seventh Lens | 1.536 | 0.230 | 1.546 | 56.095 | 3.140 |
| S14 |  | 0.798 | 0.345 |  |  | 3.258 |
| S15 | Filter | infinity | 0.210 | 1.518 | 64.197 | 3.730 |
| S16 |  | infinity | 0.656 |  |  | 3.804 |
| S17 | Imaging Plane | infinity | 0.034 |  |  | 4.000 |

TABLE 10

| Surface No. | R | K | A | B | C | D |
|---|---|---|---|---|---|---|
| S1 | −5.2231 | 0.3822 | 0.1345 | −0.0994 | 0.0608 | 0.0576 |
| S2 | −2.8853 | −0.9582 | 0.4039 | −1.1538 | 3.3582 | −7.7188 |
| S3 | 1.7518 | −1.6089 | 0.0712 | −0.9480 | 4.3067 | −13.4321 |
| S4 | 1.5055 | −0.4836 | −0.3193 | 1.3677 | −12.9841 | 110.2421 |
| S5 | 15.3543 | 0.0000 | −0.0845 | 2.1836 | −37.7602 | 407.8684 |
| S6 | −2.2274 | −0.8668 | −0.0035 | −2.2349 | 21.9637 | −135.2857 |
| S7 | −2.9795 | 1.9576 | −0.2679 | 1.0331 | −12.0087 | 72.5541 |
| S8 | −7.0037 | 25.3938 | −0.0014 | −0.1425 | −0.8751 | 5.2255 |
| S9 | −1.6630 | −1.6612 | 0.5011 | −0.7543 | 0.6738 | −0.4359 |
| S10 | −3.9101 | −8.5250 | −0.1240 | −0.1362 | 0.7218 | −1.6701 |
| S11 | 1.2910 | −1.2744 | −0.1627 | 0.1859 | −0.3038 | 0.2993 |
| S12 | −22.1981 | 0.0000 | 0.4858 | −0.6241 | 0.4517 | −0.2122 |
| S13 | 1.5357 | −3.8178 | −0.2857 | −0.0258 | 0.2127 | −0.1890 |
| S14 | 0.7981 | −1.0247 | −0.7001 | 0.5895 | −0.4221 | 0.2465 |

| Surface No. | E | F | G | H | J |
|---|---|---|---|---|---|
| S1 | −0.2569 | 0.4191 | −0.4175 | 0.2768 | −0.1246 |
| S2 | 13.1437 | −16.3401 | 14.7823 | −9.6812 | 4.5291 |
| S3 | 25.5617 | −20.9831 | −24.0562 | 95.3473 | −135.6567 |
| S4 | −667 | 2798 | −8203 | 16903 | −24346 |
| S5 | −2948 | 14797 | −52618 | 133335 | −239007 |
| S6 | 559 | −1604 | 3262 | −4739 | 4887 |
| S7 | −270 | 678 | −1192 | 1485 | −1307 |
| S8 | −13.2379 | 20.1932 | −19.9449 | 12.6582 | −4.6493 |
| S9 | 0.7245 | −1.6423 | 2.2771 | −1.9680 | 1.1120 |

TABLE 10-continued

| | | | | | |
|---|---|---|---|---|---|
| S10 | 2.5521 | −2.5981 | 1.7792 | −0.8233 | 0.2548 |
| S11 | −0.1826 | 0.0704 | −0.0167 | 0.0021 | 0.0000 |
| S12 | 0.0644 | −0.0113 | 0.0004 | 0.0003 | −0.0001 |
| S13 | 0.1005 | −0.0375 | 0.0102 | −0.0021 | 0.0003 |
| S14 | −0.1110 | 0.0374 | −0.0093 | 0.0017 | −0.0002 |

Table 11 illustrates characteristic values of the imaging lens systems according to the first to fifth examples.

TABLE 11

| Remark | First Example | Second Example | Third Example | Fourth Example | Fifth Example |
|---|---|---|---|---|---|
| f number | 1.850 | 1.860 | 2.070 | 1.870 | 2.040 |
| TTL | 5.900 | 5.900 | 5.530 | 5.900 | 5.700 |
| ImgH | 4.000 | 4.000 | 4.000 | 4.000 | 4.000 |
| FOV | 100.03 | 100.05 | 100.02 | 100.40 | 100.30 |
| f | 3.303 | 3.337 | 3.401 | 3.346 | 3.346 |
| f1 | 12.655 | 20.035 | 14.480 | 10.321 | 11.083 |
| f2 | −24.199 | −99.201 | −24.818 | −18.678 | −27.401 |
| f3 | 4.193 | 4.322 | 4.198 | 3.323 | 3.630 |
| f4 | −33.107 | −32.368 | −23.241 | −7.335 | −7.853 |
| f5 | −4.731 | −5.040 | −4.892 | −4.983 | −5.390 |
| f6 | 1.746 | 1.814 | 1.683 | 2.765 | 2.254 |
| f7 | −2.029 | −2.026 | −1.943 | −7.545 | −3.420 |

In addition, the imaging lens systems may have the following optical characteristics. For example, an overall length TTL of the imaging lens system is determined within a range of 5.6 to 6.0 mm, a focal length of the imaging lens system is determined within a range of 3.0 to 3.5 mm, a focal length of the first lens is within a range of 10 to 22 mm, a focal length of the second lens is determined to be −18 mm or less, a focal length of the third lens is determined within arrange of 3.0 to 4.5 mm, a focal length of the fourth lens is determined within a range of −40 to −7.0 mm, a focal length of the fifth lens is determined within a range of −6.0 to −4.0 mm, a focal length of the sixth lens is determined within a range of 1.4 to 3.0 mm, and a focal length of the seventh lens is determined within a range of −10 to −1.0 mm. In addition, a field of view (FOV) of the imaging lens system is 100 degrees or more.

Table 12 illustrates values of conditional expressions of the imaging lens systems according to the first to fifth examples.

TABLE 12

| Conditional Expression | First Example | Second Example | Third Example | Fourth Example | Fifth Example |
|---|---|---|---|---|---|
| (ImgH/(f*tan(FOV/2)) − 1)*100 | 1.5556 | 0.4955 | −1.3368 | −0.3940 | −0.2121 |
| TTL/ImgH | 1.4749 | 1.4750 | 1.4750 | 1.4647 | 1.4290 |
| D12/D23 | 0.0603 | 0.0976 | 0.1079 | 0.0815 | 0.1169 |
| D23/D34 | 2.7050 | 2.5375 | 1.4921 | 1.2861 | 1.3329 |
| f3/f2 | −0.1733 | −0.0436 | −0.1692 | −0.1779 | −0.1325 |
| TTL/f | 1.7860 | 1.7682 | 1.7348 | 1.7510 | 1.7085 |
| Tmax/Tmin | 3.5673 | 3.9224 | 4.5852 | 4.8307 | 3.9960 |
| Tmax/ImgH | 0.2051 | 0.2255 | 0.2636 | 0.2816 | 0.2298 |

As described above, performance of a small-sized camera may be implemented.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
   a first lens having positive refractive power and comprising a concave object-side surface, a second lens having negative refractive power, a third lens, a fourth lens, a fifth lens having negative refractive power, a sixth lens comprising a concave image-side surface in a paraxial region, and a seventh lens disposed in order from an object side,
   wherein a field of view of the imaging lens system is 100 degrees or more, and
   wherein TTL/ImgH<1.5, where TTL is a distance from the object-side surface of the first lens to an imaging plane and ImgH is a height of the imaging plane.

2. The imaging lens system of claim 1, wherein the third lens has positive refractive power.

3. The imaging lens system of claim 1, wherein an object-side surface of the fourth lens is convex.

4. The imaging lens system of claim 1, wherein an object-side surface of the fifth lens is concave.

5. The imaging lens system of claim 1, wherein the sixth lens has positive refractive power.

6. The imaging lens system of claim 5, wherein the seventh lens has negative refractive power.

7. The imaging lens system of claim 1, wherein $$-2.0<(ImgH/(f*tan(FOV/2))-1)*100<2.0,$$

where f is a focal length of the imaging lens system and FOV is a field of view of the imaging lens system.

8. The imaging lens system of claim 1, wherein $$D12/D23<0.14,$$

where D12 is a distance from an image-side surface of the first lens to an object-side surface of the second lens and D23 is a distance from an image-side surface of the second lens to an object-side surface of the third lens.

9. The imaging lens system of claim 1, wherein $$1.2<D23/D34,$$

where D23 is a distance from an image-side surface of the second lens to an object-side surface of the third lens and D34 is a distance from an image-side surface of the third lens to an object-side surface of the fourth lens.

10. The imaging lens system of claim 1, wherein $-0.2 < f3/f2 < -0.04$, where f2 is a focal length of the second lens and f3 is a focal length of the third lens.

11. An imaging lens system comprising:
a plurality of lenses disposed on an object-side of an imaging plane, the plurality of lenses including a first lens, a second lens having negative refractive power, a third lens, a fourth lens, a fifth lens, a sixth lens comprising a concave image-side surface in a paraxial region, and a seventh lens disposed in order from an object side,
wherein $-2.0 < (ImgH/(f*\tan(FOV/2))-1)*100 < 2.0$, and $TTL/ImgH < 1.5$, where ImgH is a height of the imaging plane, f is a focal length of the imaging lens system, FOV is a field of view of the imaging lens system, and TTL is a distance from an object-side surface of a lens, from among the plurality of lenses, disposed closest to the object side, to the imaging plane, and
wherein a radius of curvature of an object-side surface of the second lens is greater than a radius of curvature of an object-side surface of the seventh lens.

12. The imaging lens system of claim 11, wherein the field of view of the imaging lens system is 100 degree or more.

13. The imaging lens system of claim 11, wherein the first lens has positive refractive power and an object-side surface that is concave.

14. The imaging lens system of claim 11, wherein $1.6 < TTL/f < 1.8$.

15. The imaging lens system of claim 11, wherein $0.2 < Tmax/ImgH < 0.3$, where Tmax is a thickness of a center of a lens having the highest thickness in a center of an optical axis, among the plurality of lenses.

* * * * *